[19] United States Patent
Adams, Jr. et al.

(10) Patent No.: US 8,036,896 B2
(45) Date of Patent: Oct. 11, 2011

(54) SYSTEM, SERVER AND METHOD FOR DISTRIBUTED LITERACY AND LANGUAGE SKILL INSTRUCTION

(75) Inventors: Hugh William Adams, Jr., Wappingers Falls, NY (US); Peter Gustav Fairweather, Yorktown Heights, NY (US); Yael Ravin, Mount Kisco, NY (US)

(73) Assignee: Nuance Communications, Inc., Burlington, MA (US)

( * ) Notice: Subject to any disclaimer, the term of this patent is extended or adjusted under 35 U.S.C. 154(b) by 750 days.

(21) Appl. No.: 11/406,843

(22) Filed: Apr. 18, 2006

(65) Prior Publication Data

US 2007/0244703 A1 Oct. 18, 2007

(51) Int. Cl.
*G10L 11/00* (2006.01)
(52) U.S. Cl. .............. 704/270; 704/270.1; 704/251; 434/178; 434/185
(58) Field of Classification Search .............. 704/251, 704/270.1; 434/178, 185
See application file for complete search history.

(56) References Cited

U.S. PATENT DOCUMENTS

| 4,078,319 A | | 3/1978 | Mazeski et al. | |
|---|---|---|---|---|
| 4,397,635 A | | 8/1983 | Samuels | |
| 5,540,589 A | | 7/1996 | Waters | |
| 5,875,425 A | * | 2/1999 | Nakamura et al. | 704/231 |
| 6,017,219 A | | 1/2000 | Adams, Jr. et al. | |
| 6,366,882 B1 | * | 4/2002 | Bijl et al. | 704/235 |
| 7,027,987 B1 | * | 4/2006 | Franz et al. | 704/236 |
| 7,243,071 B1 | * | 7/2007 | Resnick et al. | 704/257 |
| 7,437,294 B1 | * | 10/2008 | Thenthiruperai | 704/270.1 |
| 2003/0130840 A1 | * | 7/2003 | Forand | 704/231 |
| 2003/0174163 A1 | * | 9/2003 | Gnanamgari et al. | 345/738 |
| 2004/0153557 A1 | * | 8/2004 | Shochet et al. | 709/229 |
| 2005/0075875 A1 | * | 4/2005 | Shozakai et al. | 704/231 |
| 2006/0058999 A1 | * | 3/2006 | Barker et al. | 704/256 |

OTHER PUBLICATIONS

J. D. Fletcher et al., Computer assisted instruction in reading: Grades 4-6. Educational Technology, 12(8), 1972, 45-49.

* cited by examiner

*Primary Examiner* — Talivaldis Ivars Smits
*Assistant Examiner* — Shaun Roberts
(74) *Attorney, Agent, or Firm* — Wolf, Greenfield & Sacks, P.C.

(57) ABSTRACT

A server for providing language and literacy tutoring information to a plurality of user devices connected to a communications network, comprising a network adapter for connection to the network; a content database for providing learning content to devices via the network adaptor and the network; a plurality of speech recognition models stored in the server; a processor for processing speech data and session control data generated by a user and sent to the server by the network, the processor evaluating which of the speech recognition models provides most accurate speech recognition results; and a performance evaluator for evaluating speech produced by the user using the speech recognition model that produces the most accurate results. A system, including user devices. A method for operating the system, and a program storage medium having computer code thereon for implementing the method and system.

32 Claims, 5 Drawing Sheets

SYSTEM, SERVER AND METHOD FOR DISTRIBUTED LITERACY AND LANGUAGE SKILL INSTRUCTION

BACKGROUND OF THE INVENTION

1. Field of the Invention

The present invention relates to the development and delivery of computer-based instruction in literacy or language skills. More particularly, it relates to the use of computers using speech recognition in a distributed manner over a wide area network such as the World Wide Web.

2. Background Art

Computer-based instruction in reading and language arts was first developed and studied in the 1970's by Patrick Suppes and his colleagues at Stanford University (Fletcher and Suppes, 1972). Although oral reading instruction remained the goal, computer-based approaches evolved slowly to that point, first using text exclusively, then text with graphics enhancements (important for calling attention to particular spelling patterns or associating words with pictures, for example), text with graphics and recorded or digitized audio output, and then to text, graphics, audio output, and capture and playback of learners' oral input.

As systems progressed along this continuum of complexity, they addressed different component skills of reading or language use. An early system, as detailed in U.S. Pat. No. 4,078,319 of Mazeski et al, utilized optical components to train the student's eyes to focus on particular material and to advance laterally along the line of material to be taught, purportedly conditioning the operation of reading by training the mechanics of eye movement.

A reading teaching system having simultaneous audio and visual display of material is taught in U.S. Pat. No. 4,397,635 of Samuels, wherein the audio and/or the visual display of the material is altered to enhance the student's understanding of the meaning of the material to be learned (e.g., lower volume audio and downwardly-slanted lettering could be used to present the word "down").

The system taught in U.S. Pat. No. 5,540,589 of Waters involves the use of an audio tutoring system to enable productive trials with feedback and to monitor student progress. Essentially it offers practice on productions where the student shows errors, terminating the session when the number of errors exceeds a preset threshold.

A particular challenge associated with speech recognition systems and critical to successful implementation of an automatic interactive reading system for young children is the development of a model of children's speech with which their productions can be correctly identified. Most speech recognition systems have been developed by building acoustic models out of samples of adult speech. However, children's speech differs markedly from that of adults in terms of, for example, segmentation points, fluency, influence of home language or dialects, articulation control, pitch or even the number of distinct phonemes. The system taught in U.S. Pat. No. 6,017,219 of Adams, Jr. et al. was the first known example of a computer-based reading and language instruction system that used an acoustic model developed from children's speech data.

By way of background, many speech-recognition techniques achieve their effectiveness by operating against models of the way the user or groups of users produce language sounds, called acoustic models, and the way they string words together, called language models. (For our purposes, we will limit the discussion to acoustic models).

Current standard practice involves constructing an acoustic model using a representation known as a Hidden Markov Model (HMM). An HMM relates usually two sets of stochastically distributed elements to one another. To illustrate, an HMM with two sets of elements is used. The first set of elements comprises an observable sequence of events, $e_1, e_2, e_3 \ldots e_n$.

The second set comprises a sequence of states that are not observable (hence hidden) $s_1, s_2, s_3, \ldots S_n$. The probability of an event $e_i$ is conditioned by the hidden states where it can occur, so is expressed as the conditional probability $p(e_i|s_j)$.

Because events may occur in different states, for any particular observed set of events e there exists a sequence of states $s_i, s_j, s_k, \ldots s_n$ that is the most probable to explain the set of events observed.

HMMs provide a general representation for identifying a state or sequence of states that inhered to produce a sequence of events. If the problem is thought of as finding a label or sequence of labels for a sequence of events, then the appropriateness of an HMM for speech recognition becomes clearer.

In general terms, the efficacy of HMMs for a given problem distills to a comparison of the parameters that describe them. Briefly, these comprise:
1. the number of states in the HMM,
2. the number of distinct observations that can occur within each state,
3. the distribution of transition probabilities from state to state,
4. the distribution of event probabilities,
5. the startup state distribution.

Optimization of the models proceeds by adjusting these parameters of the HMM so that the states it nominates as the most likely match for the observed events are discriminated more clearly from other candidates.

It is difficult for a young child to provide a system with substantial samples of his or her ways of using language. Today's speech recognition systems require an amount of training material to create an acoustic model that is large enough to require that the child have to be able to read the material aloud, something the child may not be ready to do or capable of doing. Repeating large amounts of speech to provide the system with adequate material from which to build a model also lies beyond the capabilities of most children.

Usually such training of the speech-recognition system involves reading lengthy passages of text so that the system has both the textual material and its acoustic representation with which to adapt its acoustic model. Acoustic models may seem more critical than language models whose function it is to reflect the likelihood that a particular word follows a word or a sequence of words in spoken or written messages. Dictation tasks use such likelihood estimates to help disambiguate acoustic data gleaned from the speaker. In reading tasks, however, the text indicates what the reader should produce precisely without recourse to probability. However, language models can be used to predict miscues, such as word omissions, substitutions, or transpositions so they are useful to help identify erroneous productions based on data collected from previous readings of the material.

An approach requiring users to provide the system samples of how they read will not work well with students who cannot yet read, so systems using speech recognition to teach reading must use a single pre-existing acoustic model to acceptably recognize what the child has read without requiring the child to provide additional training input. This is not a satisfactory solution because variation among the forms of children's speech militates against the use of a single acoustic model for literacy training that is released along with the application using it.

SUMMARY OF THE INVENTION

Therefore, an object of this invention is to enable ongoing updating and improvement of acoustic models for users of literacy and language materials based on data collected from those users during their usage sessions.

Another object of this invention is to enable the application to create, organize, and use a plurality of acoustic models, using the results from the one that makes speech recognition most effective.

Yet another object of this invention is to enable distributed authoring of content to be delivered. Authored material, once completed, works its way through a work-flow approval process to become available for learners using the system. Web-enabled authoring opens the production of material for instruction, practice, games, and assessments related to reading and language arts to a plurality of authors while workflow monitoring permits control of the content they produce.

It is a further object of this invention that the representational form for the content serves to identify its structure, semantics, and manner of presentation, thus enabling the same semantic content to be realized in a variety of different interaction types.

It is an additional object of the invention to represent the interactions themselves so that they can be stored separately and coupled with different content representations.

Still another object of the invention, facilitated by multiple interaction types and the central maintenance of learner performance profiles on a server, is the enablement of cooperative reading instruction formats where more than one learner interacts simultaneously with the system. Participating learners may interact with one another on the system approximating ways that they could in a classroom setting. Some or all of the roles of those collaborating with a learner may be simulated by a software agent enabling the collaborating to proceed even if not all of a set of participants are available.

Another object of the invention is to separate the components responsible for interacting with users on the client device, from the portions responsible for such things as management of instruction, sessions, responses, content acoustic models, or reporting, to enable those components to be implemented to operate on a variety of client devices. These include representatives of device classes including Personal Digital Assistants (PDA), desktop computers, laptop or notebook computers, and video game devices.

Yet a another object of the invention is to enable the user to speak to the system outside the response pattern it directs the user to follow, so that the user can control the operation of the system (e.g., "Let's hurry up"), ask for help ("I don't know what this word is"), signal some affective state ("I'm tired"), or use conversational non-words in a response ("Um", "Oops", "I mean").

The above and other objectives are provided in the present invention that utilizes mechanisms distributed over multiple devices linked electronically over a network to provide for reading or language instruction realized through a variety of interactions, exploiting interaction, gaming, collaborative learning, content authoring, tool and model development. A program running on a local device creates a learning experience by drawing upon content resources and a set of interactive directives from a server. The server may exchange data and programs with more than one client device simultaneously. Some of these clients serving learners may be grouped together into shared sessions where the learners may cooperate or collaborate together in the learning experience.

Each participant interacts with the program running on the client device using conventional electromechanical input devices and produces speech as part of the reading or language instruction. These productions are segmented in some form, such as a series of vectors of speech coefficients, and are transmitted to a server. Transmissions are carried to their destination by a transport protocol that will compactly represent them and include necessary control information to accommodate their management upon their receipt. This representation is input into a recognizer that has access to a vocabulary of expected words or phrases. The recognizer uses an acoustic model drawn from a set of candidate models available on the server.

The efficacy of each of the various acoustic models can be evaluated by using it to recognize the text. With a server-based architecture, it is convenient to simultaneously use a plurality of acoustic models to recognize a reader's rendition of the text. Their results can be compared easily to determine relative efficacy.

The acoustic model judged most effective in repeated assessments can be selected as the one to use to recognize the speech productions of a participant. This enables specific models to be used to support greater recognition accuracy than that possible with a general model.

The server records the words or phrases along with the corresponding judgments, and sends them back to the set of local devices to effect a change in messages given to each user and to the state of their application. The server manages the distribution of programs and language data that are communicated to and from each client device. Besides taking responsibility for session management and speech recognition services, the server manages the instruction, tailoring learners' choices to appropriate curricular selections and manipulating the level of support and help each participant experiences. Additionally, the server collects and reports on usage and performance and usage for individual participants. Reports are provided to authorized individuals, such as parents, teachers, or course instructors. The server also manages the distributed authoring and approval of materials for use by learners using the system.

In the case of reading instruction, the server collects users' speech productions, the text to be read in response to which the productions are uttered, and the evaluations rendered for each production by the acoustic model. These new productions along with their associated text can be used to build new acoustic models in such a way as to increase recognition accuracy over the existing set.

The system of the present invention further provides for: methods for instructing using speech by distributing speech recognition tasks; methods for representing textual information such that it can be presented in a variety of instructional formats; methods for automatically extracting acoustic models from speech productions made by users that enable optimal recognition; methods for identifying a particular acoustic model developed for a group of users that produces the best speech recognition for an individual user; methods for automatically improving speech recognition by incorporating data from users into acoustic and language models used to classify and label speech productions; and methods for the distributed creation, management, and delivery of approved instructional content including interactive stories, reading and language games, individualized practice activities, informal assessment inventories, as well as formal assessments.

These objects and others are achieved in accordance with the invention by a server for providing language and literacy tutoring information to a plurality of user devices connected to a communications network, the server comprising a network adapter for connection to the network; a content database for providing learning content to devices via the network adaptor and the network; a plurality of speech recognition models stored in the server; a processor for processing speech data and session control data generated by a user and sent to the server by the network, the processor evaluating which of the speech recognition models provides most accurate speech recognition results; and a performance evaluator for evaluating speech produced by the user using the speech recognition model that produces the most accurate results. The session control data can be data generated by a pointing device associated with the user device, and the speech data includes at least one of speech vectors and pitch vectors. The speech data processed by the processor comprises for each utterance or sample of utterances produced by a user can comprise at least a sequence of observed speech production data; an acoustic model state sequence having shown a highest likelihood of matching the observed speech production data; text the user was reading aloud to provide the speech production; competing state sequences that correspond with the observed speech production data; and parameters of the acoustic model used.

The server can further comprise means for sorting pairs of state sequences and acoustic production data for a same text strings into an order based on their fit to the current acoustic model; means for selecting those pairs judged correct with a likelihood measure above a predetermined threshold; and means for recreating the acoustic model with the new data and the state sequences that accompany them.

The server can further comprise an acoustic model updater for updating the acoustic models and/or components for distinguishing speech of multiple users who use a single user device.

The server can further comprising a manager for managing a plurality of users using different user devices so that events and actions of instruction on one of the user devices appear to be included in a steam of events and actions on an other one of the devices.

The invention is also directed to the server, in combination with the network and the plurality of user devices. In the combination each of the user devices can comprise a display for displaying instructional content to a user; a pointing device for the user to use to point to an item on the display; a speech input device; a converter for converting speech to electrical signals recognizable by one of the speech models; and a network adapter for coupling the user device to the network, so that instructional content is received from the server, and the electrical signals are transmitted to the server.

The invention is also directed to a computer readable medium having computer readable program code stored thereon for controlling elements of the server.

In accordance with another aspect, a user device for use with a network having an instructional server containing a plurality of speech models connected to the network, comprises a display for displaying instructional content to a user; a pointing device for the user to use to point to an item on the display; a speech input device; a converter for converting speech to electrical signals recognizable by one of the speech models; and a network adapter for coupling the user device to the network, so that instructional content is received from the server, and the electrical signals are transmitted to the server. The device may be one of a computer, a personal digital assistant, and a game machine.

In accordance with yet another aspect, the invention is directed to a method for operating a server to provide language and literacy tutoring information to a plurality of user devices connected to a communications network, comprising providing learning content from the server to the user devices via the network; receiving from the user devices via the network, user responses to the learning content including user speech data and session control data; processing speech data and session control data generated by a user and sent to the server by the network, to determine which of a plurality of speech recognition models provides most accurate speech recognition results; and evaluating speech produced by the user using the speech recognition model that produces the most accurate results to determine performance of the user.

The session control data can be data generated by a pointing device associated with the user device, and the speech data includes at least one of speech vectors and pitch vectors. The speech data processed can comprise, for each utterance or sample of utterances produced by a user, at least a sequence of observed speech production data; an acoustic model state sequence having shown a highest likelihood of matching the observed speech production data; text the user was reading aloud to provide the speech production; competing state sequences that correspond with the observed speech production data; and parameters of the acoustic model used.

The method can further comprise sorting pairs of state sequences and acoustic production data for a same text strings into an order based on their fit to the current acoustic model; selecting those pairs judged correct with a likelihood measure above a predetermined threshold; and recreating the acoustic model with the new data and the state sequences that accompany them. The method also can comprise updating the acoustic models to enhance recognition. The method can further comprise distinguishing speech of multiple users who use a single user device. The method also can further comprise portioning into sets, a user population to identify groups of individuals who perform similarly.

The method can also further comprise managing a plurality of users using different user devices so that events and actions of instruction on one of the user devices appear to be included in a steam of events and actions on another one of the devices.

The invention is also directed to a computer readable medium having computer readable program code stored thereon for causing a server to implement the method.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
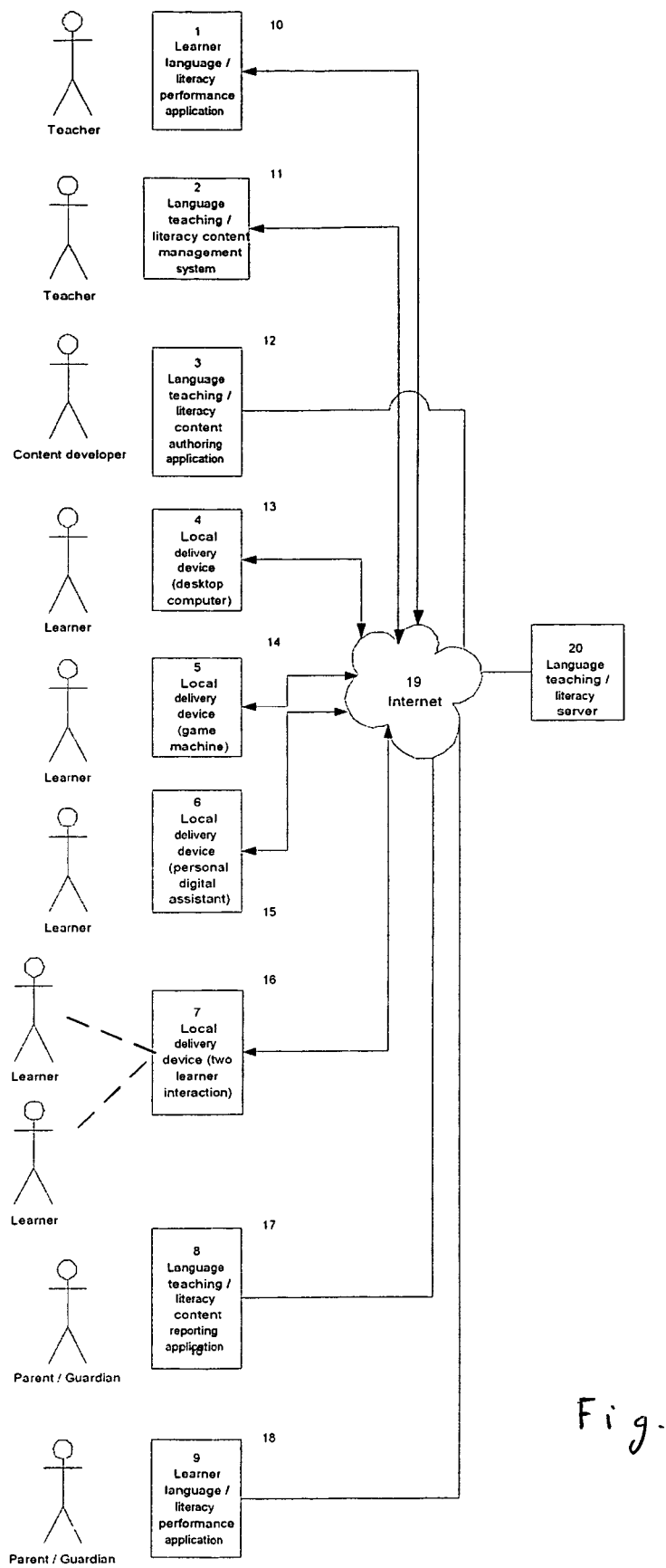
FIG. 1 is a block diagram of a system in accordance with the invention illustrating a plurality of client device types connected across the Internet to a server.

Referring to FIG. 1, there is shown a block diagram of a system incorporating features of the present invention. Although the present invention will be described with reference to the single embodiment shown in the drawings, it should be understood that the present invention can be embodied in many alternate forms of embodiments.

The invention, in its most basic embodiment as illustrated in FIG. 1, comprises a plurality of applications exemplified by 1, 2, 3, 4, 5, 6, 7, 8, and 9 operating on a plurality of client devices exemplified by 10, 11, 12, 13, 14, 15, 16, 17, 18. Each is connected through a network, such as a local network, a wide area network or the Internet 19, to one (or more) language learning/literacy server(s) 20. Application 1 on device 10 provides teachers or instructors with information about the performance of students using the system. Application 2 enables teachers or instructors to select and sequence content for presentation to learners. Application 3 enables users to create or modify content for use by learners. Applications 4, 5, and 6 enable an instructional experience by creating an interaction with a learner using a particular content representation and a particular interaction description provided by the server 20 and delivered to a plurality of platforms exemplified by a desk top computer 13, a game machine 14 and a PDA 15. Application 7 enables a similar range of learning experiences for two learners within the same session. Using speaker identification techniques, it manages each user's portion of the session separately while enabling a cooperative learning context. Application 8 organizes and presents reports on the content available to learners. Application 9 organizes and presents reports on the performance of individual learners as well as groups of learners. As noted above, applications running on client devices connect to the server 20 through a local network, a wide-area network, or more typically the World Wide Web operating over the Internet 19. Instructional functions including the identification of the learner, recognition of the learner's speech, retrieval of appropriate content, delivery of content, diagnosis of learner need, adaptation of instruction to learner needs, and storage of performance records are undertaken by applications running on a server 20.

Figure 2A:
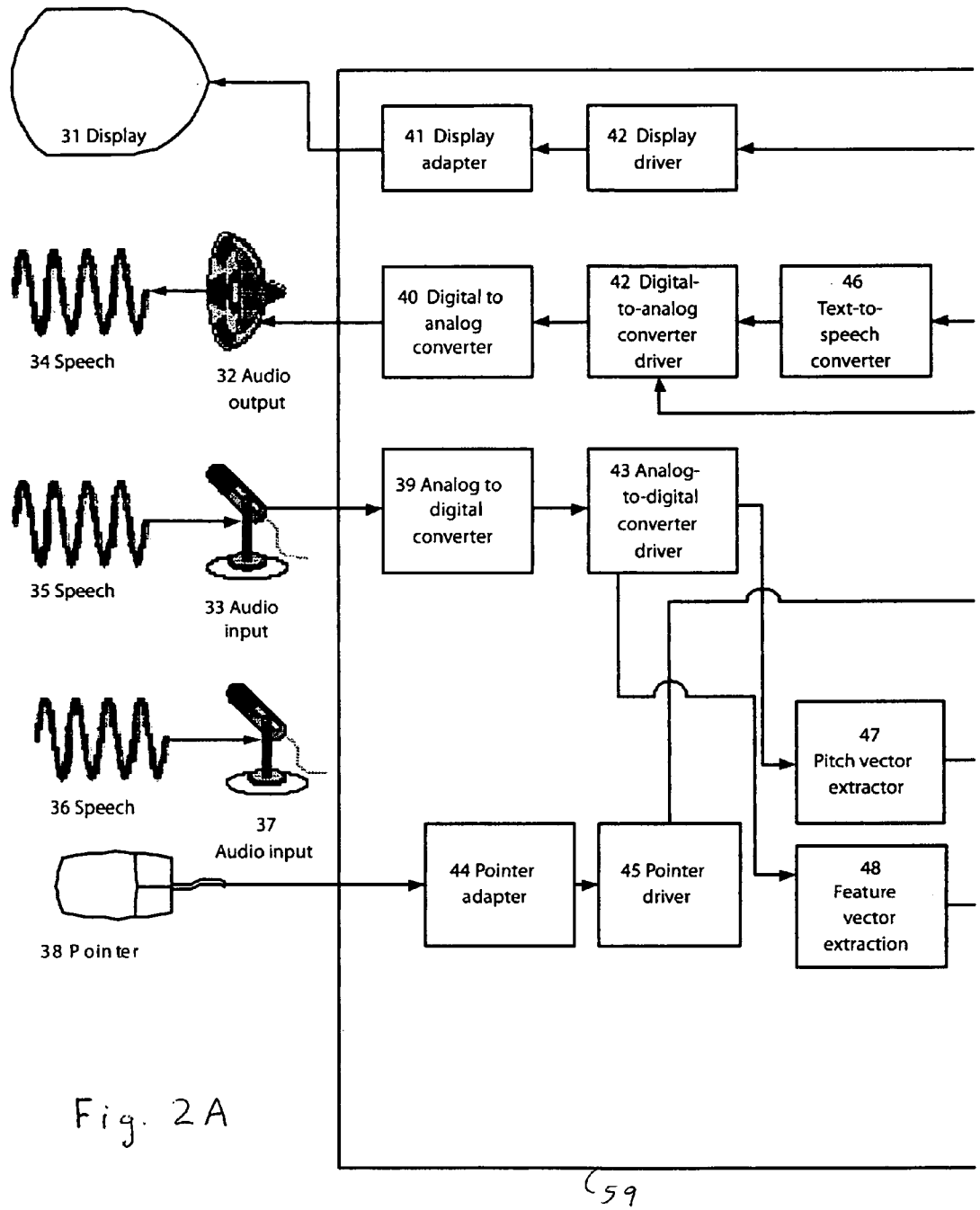
FIG. 2A and FIG. 2B, when assembled with FIG. 2A to the left of FIG. 2B, form is a block diagram which illustrates a detailed view of a typical client application connected across the Internet to a server.
Figure 2B:
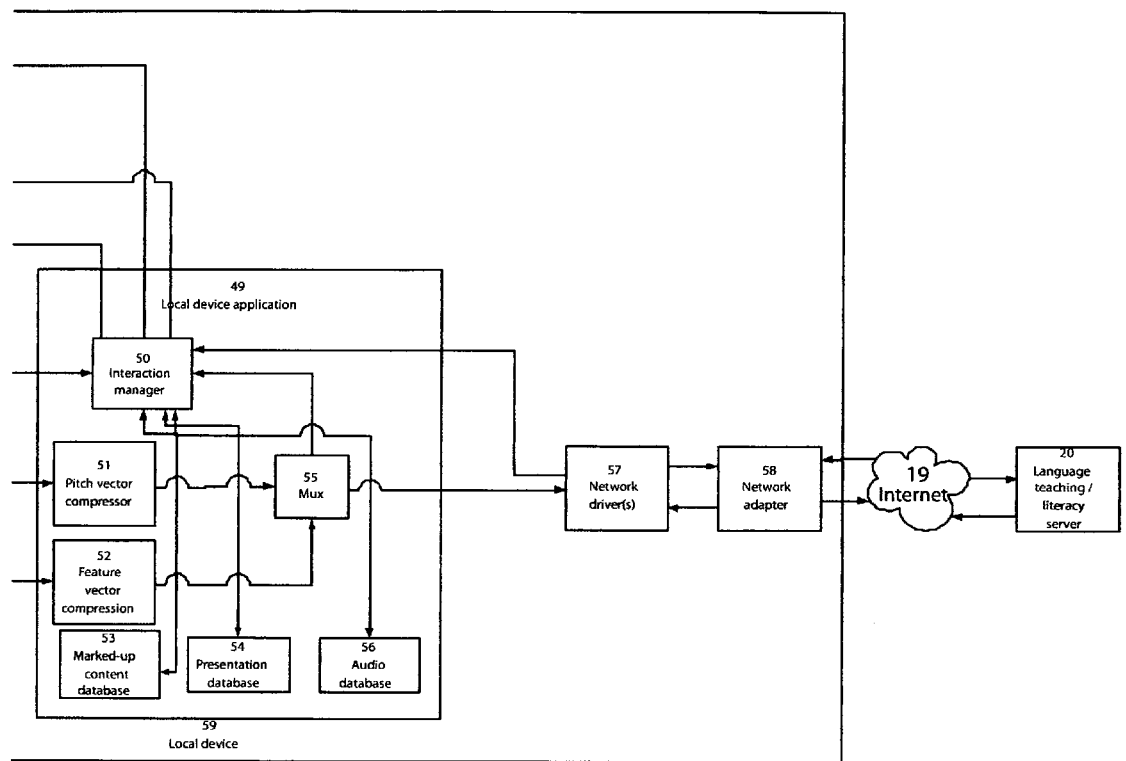

FIG. 2A and FIG. 2B offer a view of the components common to the software systems operating on the client devices labeled as 1 through 9 in FIG. 1. In other words, unless otherwise indicated, each client system supported by the invention will have the components described in FIG. 2A and FIG. 2B.

The user, for example a student, interacts with the application 49 running on the local device 59, signaling it with a pointer 38 such as a mouse, joy-stick, or a button that can indicate both position and one of at least two states, The user also interacts by speaking, using an audio input device, 33 or 37, usually a microphone. Normally, the application requires only one audio input device to serve a learner. However, one configuration of the local application provides for two simultaneous learners that take turns responding to the application as it directs.

The application is responsible for correctly associating an input with a user. The application or the server(s) 20, may extract a featural invariant, such as the fundamental harmonic for each user's voice, and label the contributions of each, so that there is monitoring and reaction to the performance of each user. However, to accommodate the current state of less than perfect accuracy of speaker identification, the application may ask the user to verify its identification via speech interaction. The application 49 communicates with the user with a display 31 in the form of a computer or television monitor or a television set used as a monitor and an audio output device 32, such as a speaker or headset. The audio output device 32 produces noises, music, computer-generated speech, speech recorded prior to the session, or samples of speech produced by the user. The display 31 is connected to the local device 59 through a display adapter 41 under the control of a display driver 42, which communicates directly or indirectly with the application 49. Generally, the display 31 should have at least four perceptually distinguishable colors or levels to permit the application 49 to differentiate portions of textual messages written to the display 31.

The user speaks in response to directives or requests from the application 49 via an audio input device 33 whose output is digitized with an analog-to-digital converter 43 controlled by the application 49 with an audio input driver (not shown). The digital representation is fed to a feature vector extractor 48 that effectively transforms it into a series of compact speech representations (e.g., mel frequency cepstral coefficients (MFCC)) that normally begins the process of speech recognition. Optionally, a pitch vector extractor 47 encodes pitch information in a vector representation. The feature and pitch vectors can be further shrunk with a feature vector compressor 52 and a pitch vector compressor 51, respectively. The interaction manager 50 associates session control information (e.g., information identifying the response requested from the user drawn from a database of text content marked up with descriptive information in a marked up content database 53) with the speech vector and pitch vector and forwards them to a multiplexer 55. Multiplexer 55 in turn routes the session control information (text and pointing device control information), the speech representation through a network adapter 58 under the control of a network driver 57. The control information, the speech vector and the pitch vector travel over a local or wide area network, usually the Internet 19, to the language teaching and literacy server 20 that completes speech recognition, compares the result with expected productions, renders a judgment, and sends appropriate messages to direct instruction on the local device 59.

Messages delivered locally draw upon visual and auditory attributes of the interactive content that are stored in presentation database 54 and audio database 56 respectively. Using local databases reduces the demands for visual, audio, and control information to be sent repeatedly by the server 20 to the application 49 by substituting database keys for previously cached extended values.

Figure 3A:
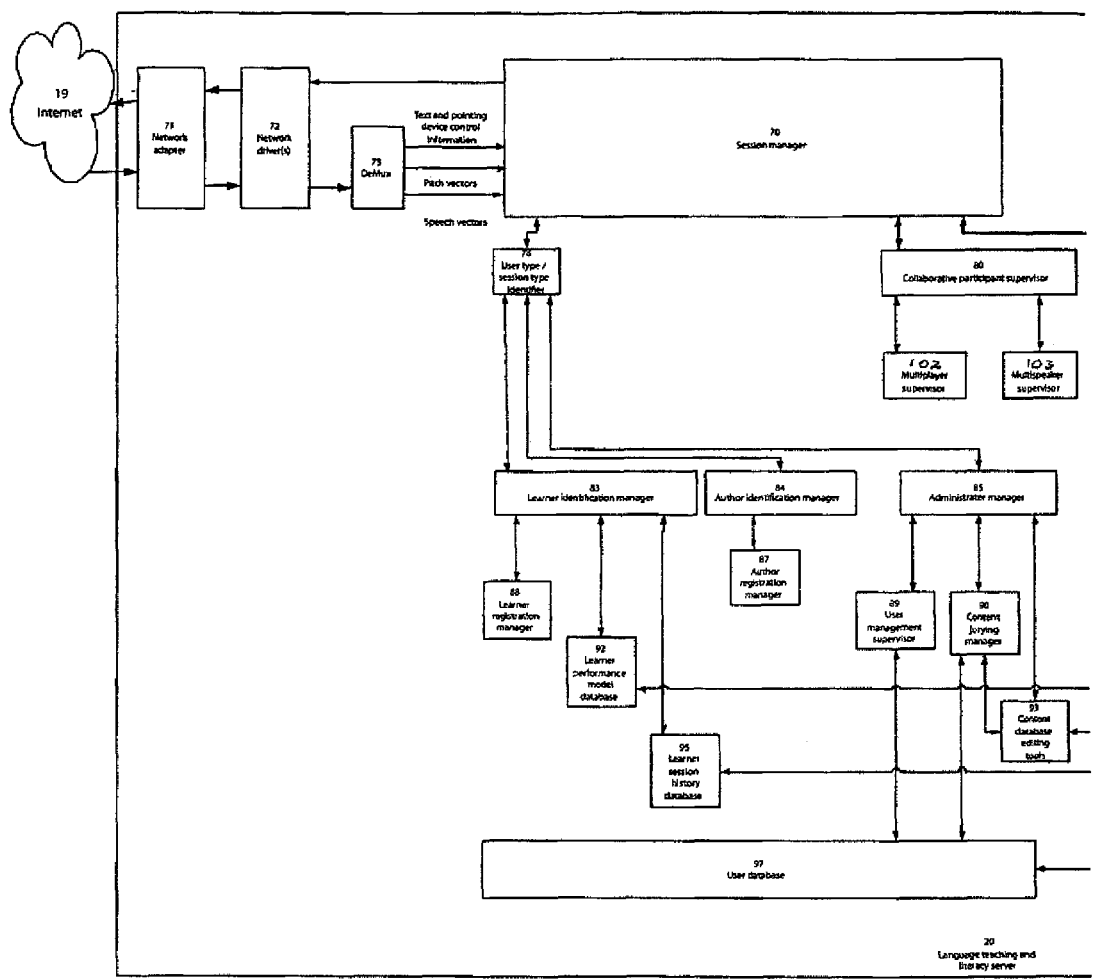
FIG. 3A and FIG. 3B, when assembled with FIG. 3A to the left of FIG. 3B, form a block diagram which illustrates a detailed view of a literacy and language server in accordance with the invention.
Figure 3B:
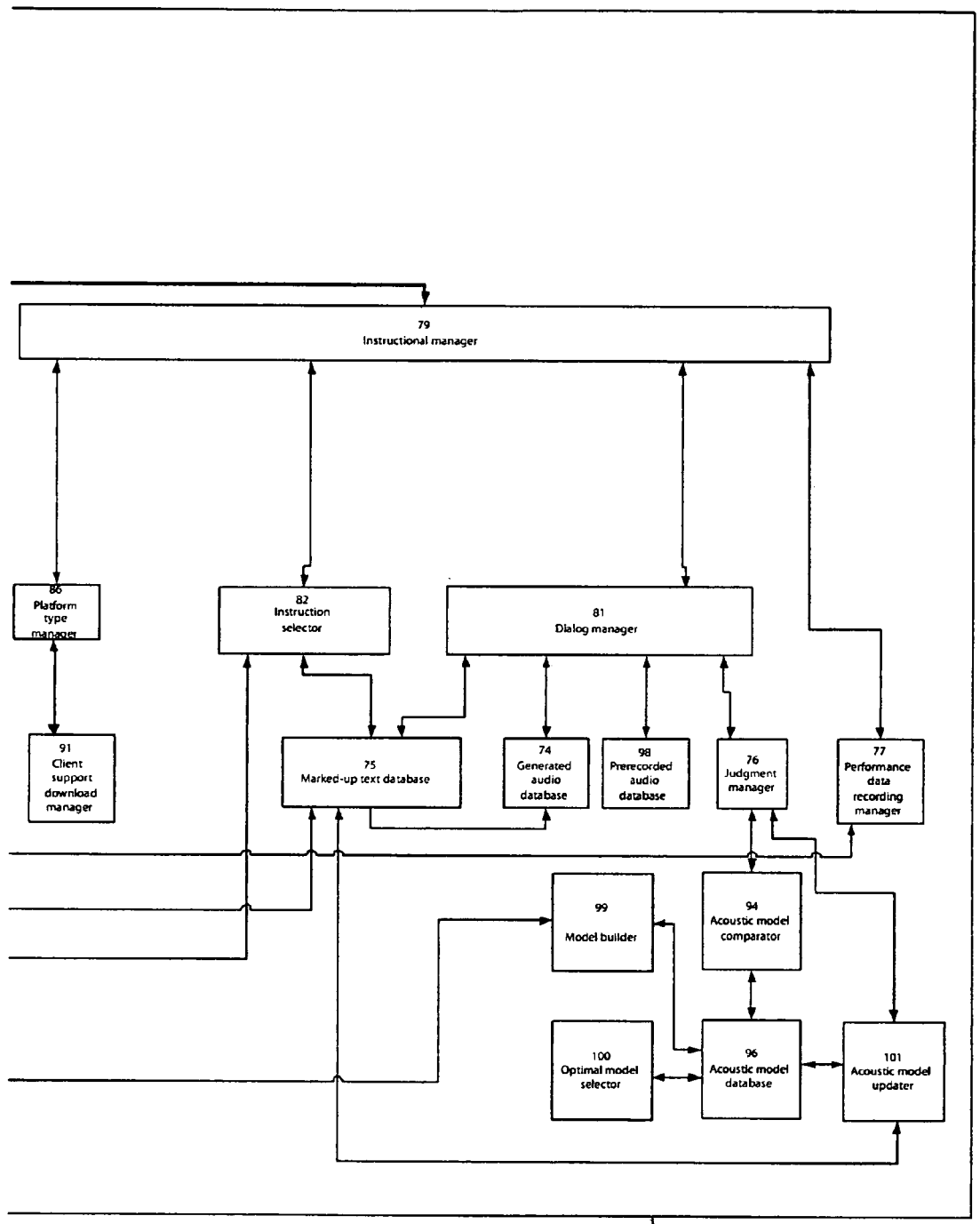

FIG. 3A and FIG. 3B provide a detailed view of the components of the literacy and language server 20. Server 20 communicates with a local device (see FIG. 2B, 59) through the Internet 19 to which it is attached with a network adapter 71 under the control of a network driver 72. Information arriving at the server is separated by a de-multiplexer 73 into information related to session control, user voice pitch, or user speech features. This information is passed, via a session manager 70, to the interaction manager 79 that has responsibility for dispatching control to other components depending on the session state and the function to be executed. The session manager 70 calls upon user type/session type identifier 78 to interact with a user (or users) to establish identity and to determine the type of interaction session (e.g., a learner reading a book, a teacher getting a performance report, or two learners engaged in a game). The user type/session type identifier 78 calls upon a learner identification manager 83, an author identification manager 84, or an administrator manager 85 to triage the user types. Users matched by the learner identification manager 83 will be validated by the system or registered into a user database 97 by a learner registration manager 88. A user established as a learner will be associated with an entry in a learner performance model database 92 that describes his or her level of performance, which level is used to adapt the level of support the interaction will provide. A learner session history database 95 holds information needed to manage the student through the current session, such as the content the learner has already seen or whether the learner has changed the level of support.

Authors are similarly validated through an author registration manager 87, that enables them to create content for use by learners. Administrators are those whom the system must validate with the administrator manager 85 for them to view selected student performance information, or to approve content for deployment to learners. The administrator manager 85 calls upon the user management supervisor 89 to grant access to information about students or controlled content. Tasks related to the review of content are assigned to the content jurying manager 90, which manages a set of content database editing tools 93.

The session manager 70 also invokes a collaborative participant supervisor 80 in two circumstances. Collaborative participant supervisor 80 dispatches to the multi-player supervisor 102 in those circumstances where the interactive session combines interactions with another user on another device. Collaborative participant supervisor 80 dispatches to the multi-speaker supervisor 103 when the interaction on a single device accepts speech productions from two users. Collaborative participant supervisor 80 takes advantage of context cues as well as information based on the MFCC data to keep track of each speaker's identity, based on the MFCC data of each speaker.

The session manager 70 also invokes the instructional manager 79 to handle the non-administrative conversational "back-and-forth" with the learner. These interactions invoke an instruction selector 82, which identifies, retrieves, and readies instructional content from a marked-up text database 75. Moment-to-moment instructional management is handled largely by a dialog manager 81, which is responsible for judging learner productions with a judgment manager 76 that, in turn, uses an acoustic model comparator 94 to determine the probability that the learner produced the expected values. The acoustic model comparator 94 works from an acoustic model database 96 that contains acoustic representations for the words and phrases that are expected to be produced in the interaction. The acoustic model comparator 94 accepts learners' speech productions and compares them to specific entries in the acoustic model database 96, returning the probability that they match.

The optimal model selector 100 operates on the acoustic model database 96, taking each speech production for a given speaker that is passed through the acoustic model comparator 94 to the acoustic model database 96 to determine how the current acoustic model fares compared to others that reside in the acoustic model database 96. If a model different than the current one competes more favorably, the optimal model selector 100 will promote the more successful one to a primary position for the current speaker. In this manner, the optimal model selector 100 assures that the model with the highest average success rate for a given speaker will be the one used for returning the judgment actually used by the literacy tutor.

An acoustic model updater 101 operates by incrementally updating the existing collection of acoustic models within the acoustic model database 96. It sorts speech productions stored within the acoustic model database 96 that were judged correct as indicated by the judgment manager 76 with a confidence level above some adjustable criterion level and rebuilds the acoustic model in the acoustic model database 96 that was used to render the judgments, so that data from the productions are included within the new model.

A model builder 99 operates by clustering the performance data from the user database 97 to identify those users whose productions most resemble one another. The speech productions judged correct in the judgment manager 76 are used with the labels provided by the marked-up text database 75 to regenerate a set of acoustic models that are placed within the acoustic model database 96.

The dialog manager 81 also manages feedback to the learner, drawing upon the generated audio database 74 that contains automatically generated speech strings and the prerecorded audio database 98 that contains speech strings input by content authors. The dialog manager can also handle responses to learner's input that directs the application interaction, such as a request to repeat, to go more slowly, to change the visual prompts, save and resume later, etc.

The instructional manager 79 also updates the learner performance model database 92 by calling upon a performance data recording manager 77. It also calls upon a platform type manager 86 that manages client-device specifics such as microphone gain and distributes and installs software required by the client-device using the client support download manager 91.

Because acoustic model building does not have to take place in real time, a means for the improvement of the effectiveness of acoustic models is offered through any of the well-known genetic algorithms. Candidate acoustic models are combined along with certain mutations to produce a set of models. These are applied in turn against a sample of the productions of the special population being considered (e.g., with particular attributes based on region, gender, or pathophysiology). A proportion of the members with the best recognition performance drawn from the new generation is selected with the remainder discarded. The sample is used to augment these new models and the process is repeated, this time with a new sample. The process is repeated until the samples are exhausted. The model with the best recognition performance on the final cycle is selected.

Advantageously, the system in accordance with the invention performs the following tasks:

1. identifies learners when they begin a session in order to associate their instructional history with each;
2. adapts the teaching approach based on learners' instructional history, elect or offer a choice of the type of interaction (e.g., game, story, practice-list)
3. selects or offers a choice of the content;
4. manages client-side or server-connected multi-user interactions;
5. accepts learner responses via ordinary input controls such as keyboard, mouse, touch panel, or mouse, for example;
6. displays or speaks messages evoking spoken responses from the user;
7. marks-up text to indicate portions for the user to read;
8. accepts learner responses in the form of speech given through a microphone;
9. accepts and recognizes a limited number of messages from the user, which are not in response to direct stimuli, and which trigger application responses, either related to the application content, its execution flow, or administrative matters.
10. extracts speech coefficients (e.g., mel frequency cepstral coefficients) to send to the server for response judgment,
11. displays textual, graphic, or audio feedback to users spoken responses;
12. shapes learner language or literacy behavior by providing positive and negative feedback to their speech productions;
13. records learners responses as well as the performance context within which those responses were elicited;
14. records and maintain running language or literacy skill inventory for each learner; and 15. adjusts the level of support provided to learners based on their level of performance.

Variations described for the present invention can be realized in any combination desirable for each particular application. Thus particular limitations, and/or embodiment enhancements described herein, which may have particular advantages to the particular application need not be used for all applications. Also, it should be realized that not all limitations need be implemented in methods, systems and/or apparatus including one or more concepts of the present invention.

The present invention can be realized in hardware, software, or a combination of hardware and software.

Any kind of computer system (or other apparatus adapted for carrying out the methods and/or functions described herein) is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system, is able to carry out these methods. Computer program means or computer program in the present context include any expression, in any language, code or notation, of a set of instructions intended to cause a system having an information processing capability to perform a particular function either directly or after conversion to another language, code or notation, and/or reproduction in a different material form.

Thus, the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. The concepts of this invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art. Thus, it should be understood that the embodiments has been provided as an example and not as a limitation. The scope of the invention is defined by the appended claims.

What is claimed is:

1. An apparatus for providing language and literacy tutoring information to a user, the apparatus comprising:
    a plurality of acoustic models stored in an acoustic model data set; and
    a processor programmed to:
        present to the user, via an application, text to be read aloud by the user;
        process speech data resulting from the user's reading of the text aloud by;
            evaluating the speech data using at least two acoustic models of said plurality of acoustic models to generate speech recognition data for each of the at least two acoustic models;
            determining which of the at least two acoustic models provides most accurate speech recognition results for the speech data and selecting a most accurate acoustic model based on the determining; and
            evaluating reading performance of the user by comparing the text to results of a speech recognition process performed on the speech data using the most accurate acoustic model; and
        present feedback to the user on the user's reading performance,
    wherein the processor is programmed to determine which of the at least two acoustic models provides most accurate speech recognition results for the speech data at least by:
        based at least in part on results of the evaluating of the speech data using the at least two acoustic models and on data regarding historical success rates of each of the at least two acoustic models evaluating previously-received speech data of the user, determining a success rate for each of the at least two acoustic models; and
        selecting, as the most accurate acoustic model, an acoustic model having a highest success rate.

2. The apparatus of claim 1, wherein the processor receives as input session control data generated by a pointing device operated by the user, and
    wherein the speech data includes at least one of speech vectors and pitch vectors.

3. The apparatus of claim 1, wherein the speech data processed by the processor comprises, for each utterance or sample of utterances produced by the user, at least:
    a sequence of speech production data;
    an acoustic model state sequence having shown a highest likelihood of matching the speech production data;
    text the user was reading aloud to provide the speech production data;
    competing state sequences that correspond with the speech production data; and
    parameters of the most accurate acoustic model.

4. The apparatus of claim 3, wherein the processor is further programmed to:
    sort at least one pair of a state sequence and speech production data for a text string into an order based on a fit to the best acoustic model;
    select those pairs judged correct with a likelihood measure above a predetermined threshold; and
    using the selected pairs, update the most accurate acoustic model with the speech production data and the corresponding state sequences.

5. The apparatus of claim 1, wherein the processor is further programmed to update the plurality of acoustic models by, when an acoustic model of the plurality of acoustic models is determined to have been successful in recognizing the speech data, updating the acoustic model based on the speech data.

6. The apparatus of claim 1, wherein the processor is further programmed to distinguish speech of multiple users who use a single user device.

7. The apparatus of claim 1, further comprising a manager for managing a plurality of users using different user devices so that events and actions of instruction on one of said user devices appear to be included in a stream of events and actions on an other one of said devices.

8. The apparatus of claim 1, in combination with a plurality of user devices each producing speech data and submitting the speech data to the apparatus for analysis, wherein a user device is executing the application and the apparatus presents the text to the user via the application by providing the text to the user device.

9. The apparatus of claim 1, wherein the application is capable of interacting with at least two users in a same session,
wherein the processor presents text to the at least two users via the application, and
wherein the processor evaluates separately, using the at least two acoustic models, first speech data resulting from a first user reading the text aloud and second speech data resulting from a second user reading the text aloud.

10. The apparatus of claim 1, wherein the processor is further programmed to process the speech data by determining, for each acoustic model of the at least two acoustic models with which the speech data is evaluated, an average success rate for the acoustic model, the average success rate for the acoustic model being determined based on a degree of success of the acoustic model in generating speech recognition data for the user for the speech data and in generating previous speech recognition data for the user for previous speech data resulting from the user's reading of previous text aloud, and
wherein the processor is further programmed to select a most accurate acoustic model by selecting an acoustic model having a highest average success rate.

11. The apparatus of claim 1, wherein the processor is programmed to select a most accurate acoustic model from the at least two acoustic models by selecting an acoustic model that is most effective over repeated assessments of speech data resulting from reading aloud of text by the user.

12. The apparatus of claim 1, wherein the processor is programmed to present at least two texts and receive at least two units of speech data resulting from the user's reading aloud of the at least two texts, and the processor is further programmed to evaluate the at least two units of speech data using the at least two acoustic models.

13. The apparatus of claim 1, wherein the speech data comprises audio data resulting from the user's reading of the text aloud.

14. The apparatus of claim 1, wherein the processor is programmed to determine the success rate over time for each of the at least two acoustic models by calculating an average success rate for each of the at least two acoustic models based at least in part on the results and the historical success rates.

15. The apparatus of claim 1, wherein the processor is programmed to select the acoustic model having the highest success rate without considering which acoustic model produced most accurate results of the evaluating of the speech data resulting from the user's reading of the text aloud.

16. A method to provide language and literacy tutoring information to a user, the method comprising:
providing learning content to the user via an application, the learning content being text to be read aloud by the user;
receiving speech data resulting from the user's reading of the text aloud;
evaluating the speech data using a plurality of acoustic models to generate speech recognition data for each of the plurality of acoustic models;
determining which of the plurality of acoustic models provides most accurate speech recognition results for the speech data and selecting a most accurate acoustic model based on the determining;
evaluating reading performance of the user by comparing the text to results of a speech recognition process performed on the speech data using the most accurate acoustic model; and
presenting feedback to the user based on the user's reading performance,
wherein determining which of the at least two acoustic models provides most accurate speech recognition results for the speech data comprises:
based at least in part on results of the evaluating of the speech data using the at least two acoustic models and on data regarding historical success rates of each of the at least two acoustic models evaluating previously-received speech data of the user, determining a success rate for each of the at least two acoustic models; and
selecting, as the most accurate acoustic model, an acoustic model having a highest success rate.

17. The method of claim 16, further comprising receiving session control data generated by a pointing device operated by the user, and
wherein the speech data includes at least one of speech vectors and pitch vectors.

18. The method of claim 16, wherein the speech data processed comprises, for each utterance or sample of utterances produced by a user, at least:
a sequence of speech production data;
an acoustic model state sequence having shown a highest likelihood of matching the speech production data;
text the user was reading aloud to provide the speech production data;
competing state sequences that correspond with the speech production data; and
parameters of the most accurate acoustic model.

19. The method of claim 18, further comprising:
sorting at least one pair of a state sequence and speech production data for a text string into an order based on a fit to the best acoustic model;
selecting those pairs judged correct with a likelihood measure above a predetermined threshold; and
using the selected pairs, updating the most accurate acoustic model with the speech production data and the corresponding state sequences.

20. The method of claim 16, further comprising updating the plurality of acoustic models to enhance recognition.

21. The method of claim 16, further comprising distinguishing speech of multiple users who use a single user device.

22. The method of claim 16, further comprising portioning into sets, a user population to identify groups of individuals who perform similarly.

23. The method of claim 16, further comprising managing a plurality of users using different user devices so that events and actions of instruction on one of said user devices appear to be included in a stream of events and actions on an other one of said devices.

24. The method of claim 16, wherein determining the success rate over time for each of the at least two acoustic models comprises calculating an average success rate for each of the at least two acoustic models based at least in part on the results and the historical success rates.

25. The method of claim 16, wherein selecting the acoustic model having the highest success rate is performed without considering which acoustic model produced most accurate results of the evaluating of the speech data resulting from the user's reading of the text aloud.

26. A computer-readable storage medium having computer-executable instructions stored thereon that, when executed by a computer, cause the computer to implement a method for providing language and literacy tutoring information to a user, the method comprising:
  providing learning content to the user via an application, the learning content being text to be read aloud by the user;
  receiving speech data resulting from the user's reading of the text aloud;
  evaluating the speech data using a plurality of acoustic models to generate speech recognition data for each of the plurality of acoustic models;
  determining which of the plurality of acoustic models provides most accurate speech recognition results for the speech data and selecting a most accurate acoustic model based on the determining;
  evaluating reading performance of the user by comparing the text to results of a speech recognition process performed on the speech data using the most accurate acoustic model; and
  presenting feedback to the user based on the user's reading performance,
  wherein determining which of the at least two acoustic models provides most accurate speech recognition results for the speech data comprises:
    based at least in part on results of the evaluating of the speech data using the at least two acoustic models and on data regarding historical success rates of each of the at least two acoustic models evaluating previously-received speech data of the user, determining a success rate for each of the at least two acoustic models; and
    selecting, as the most accurate acoustic model, an acoustic model having a highest success rate.

27. The computer-readable storage medium of claim 26, wherein the method further comprises receiving session control data generated by a pointing device operated by the user, and
wherein the speech data includes at least one of speech vectors and pitch vectors.

28. The computer-readable storage medium of claim 26, wherein the speech data processed comprises, for each utterance or sample of utterances produced by a user, at least:
  a sequence of speech production data;
  an acoustic model state sequence having shown a highest likelihood of matching the speech production data;
  text the user was reading aloud to provide the speech production data;
  competing state sequences that correspond with the speech production data; and parameters of the most accurate acoustic model.

29. The computer-readable storage medium of claim 28, wherein the method further comprises:
  sorting at least one pair of a state sequence and speech production data for a text string into an order based on a fit to the best acoustic model;
  selecting those pairs judged correct with a likelihood measure above a predetermined threshold; and
  using the selected pairs, updating the most accurate acoustic model with the speech production data and the corresponding state sequences.

30. The computer-readable storage medium of claim 26, wherein the method further comprises distinguishing speech of multiple users who use a single user device.

31. The at least one computer-readable storage medium of claim 26, wherein determining the success rate over time for each of the at least two acoustic models comprises calculating an average success rate for each of the at least two acoustic models based at least in part on the results and the historical success rates.

32. The at least one computer-readable storage medium of claim 26, wherein selecting the acoustic model having the highest success rate is performed without considering which acoustic model produced most accurate results of the evaluating of the speech data resulting from the user's reading of the text aloud.

* * * * *